United States Patent
Judge, Jr.

[11] 3,832,082
[45] Aug. 27, 1974

[54] SERVO CONTROL FOR MANUFACTURING STATIONS

[76] Inventor: Edward E. Judge, Jr., 2104 Cumberland Rd., Lansing, Mich. 48906

[22] Filed: Nov. 10, 1972

[21] Appl. No.: 305,510

[52] U.S. Cl.......................... 408/10, 90/15, 408/130
[51] Int. Cl..... B23b 49/04, B23b 47/22, B23c 3/00
[58] Field of Search............. 408/8, 10, 11, 12, 130; 90/15, 16

[56] References Cited
UNITED STATES PATENTS

| | | | |
|---|---|---|---|
| 2,986,957 | 6/1961 | Klancnik............................ | 408/130 |
| 3,302,492 | 2/1967 | Weidig................................. | 408/8 |
| 3,487,730 | 1/1970 | Dohring et al...................... | 408/10 |
| 3,605,909 | 9/1971 | Lemelson............................ | 408/8 |

*Primary Examiner*—Francis S. Husar
*Attorney, Agent, or Firm*—Farley, Forster and Farley

[57] ABSTRACT

The invention comprises a feed back control device for repetitive production machining of similar parts which senses the position of each part at a machining station, modulates rapid and gradual movement of a machining carriage into accurate relationship with the part, compensating for any size variation between parts, controls the machining operation and the retraction of the carriage from the part. In one of the preferred embodiments the servo mechanism positions the carriage at one of a plurality of distinct part size positions the selection of which depends upon the end position of the part sensed and controls a machining operation at a corresponding accurately fixed position independent of minor variations in the sensed end position. In the other preferred embodiment the servo mechanism senses the part end position, and in response thereto controls the carriage position for beginning the machining operation on the part. The invention includes hydraulic valve means having fast forward, fast reverse and modulation modes. The valve means is controlled by mechanical linkage engageable by part sensing means, all of the above moving in coordination with the movement of the carriage. Upon the sensing of a part, the linkage actuates the valve means into modulation mode to position and control the operation of the machining head on the part. The control features hydraulic feed with mechanical lead screw accuracy of feed rate during the valve modulated machining phase together with rapid advance and retract phases under full unmodulated flow.

18 Claims, 15 Drawing Figures

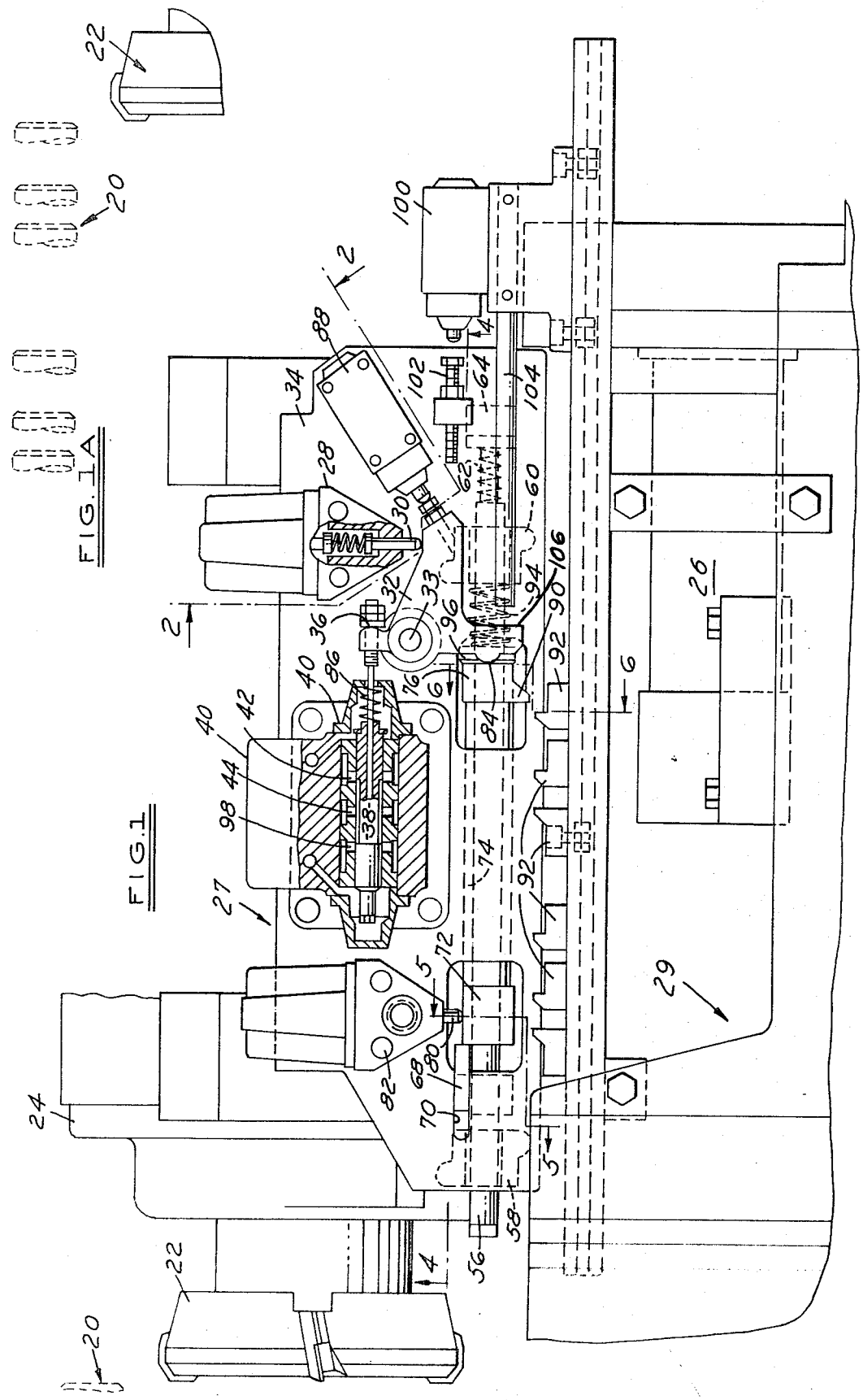

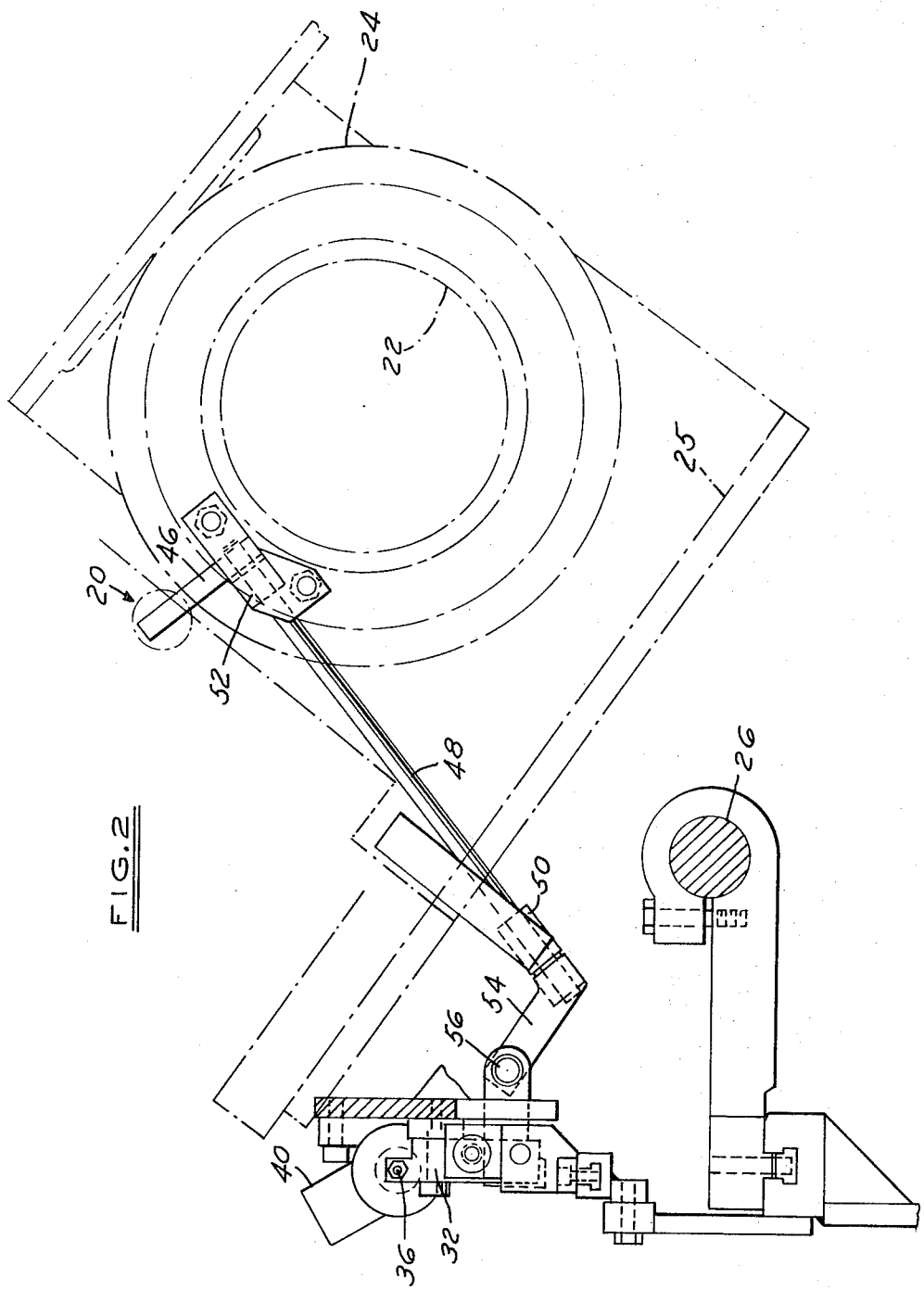

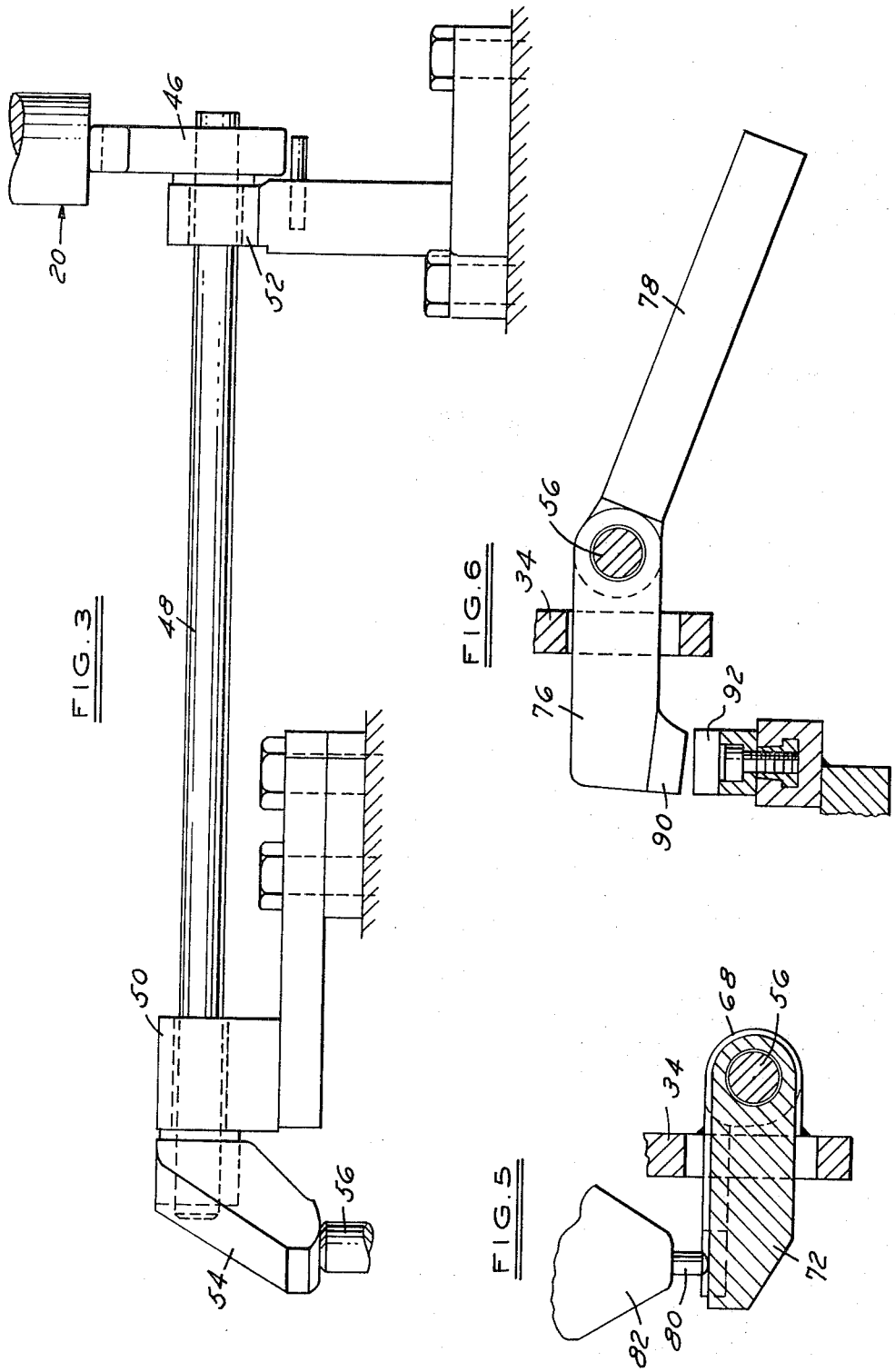

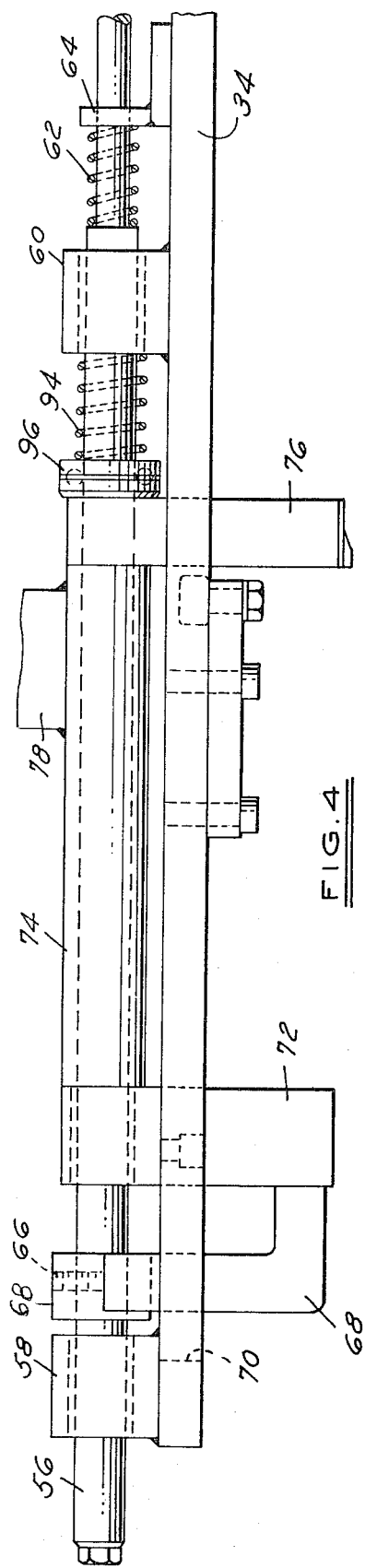
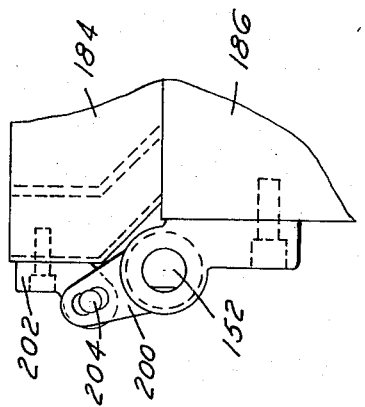
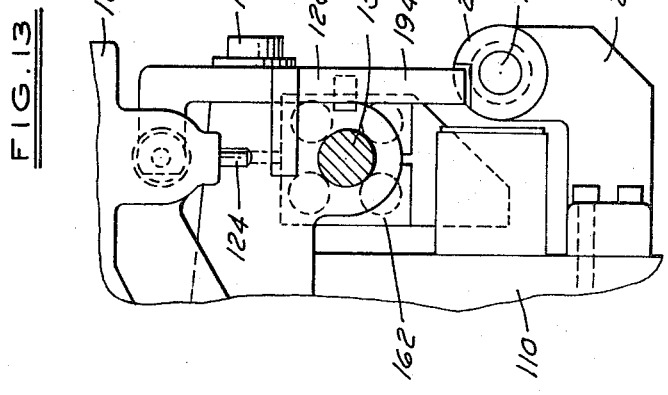

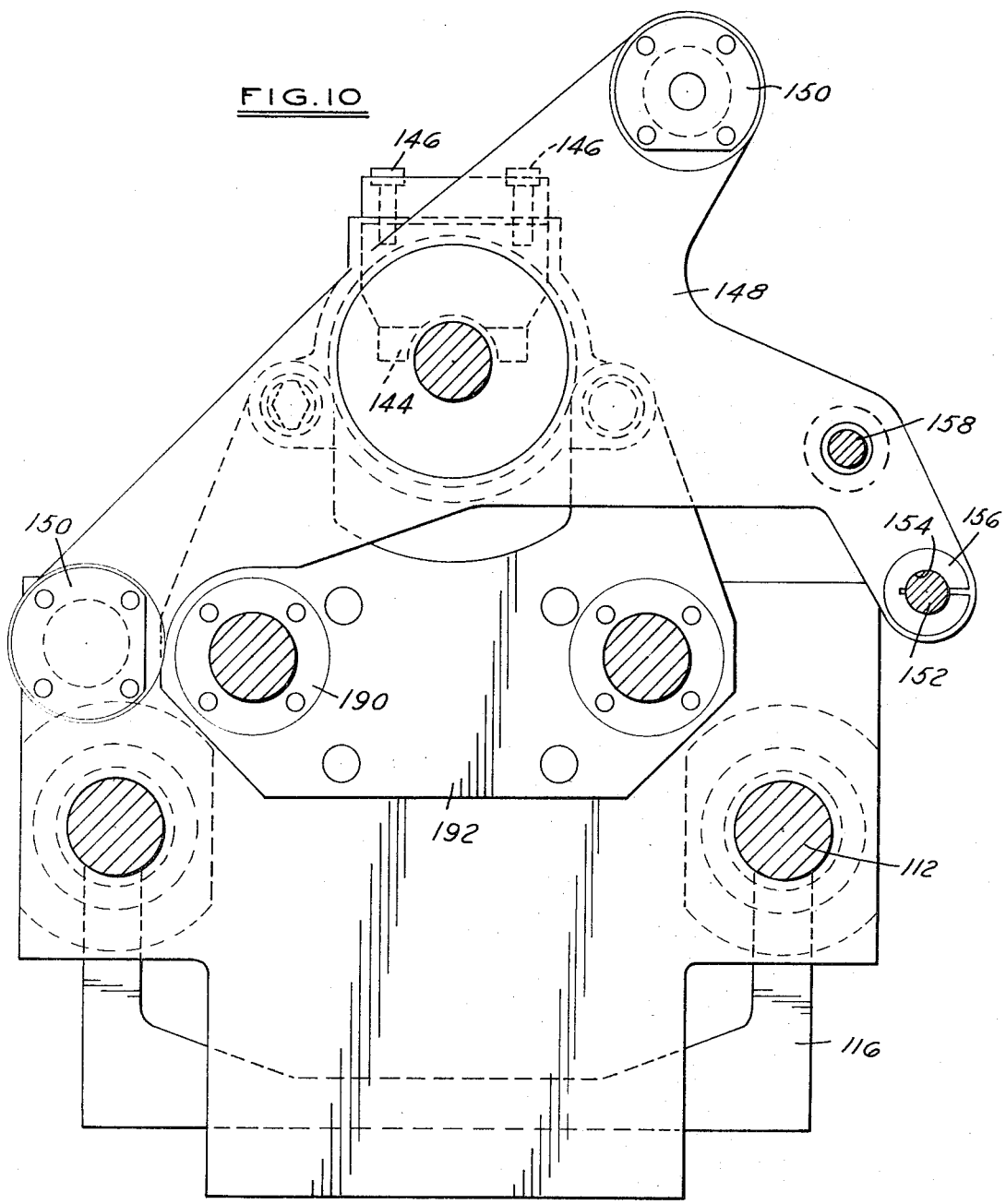

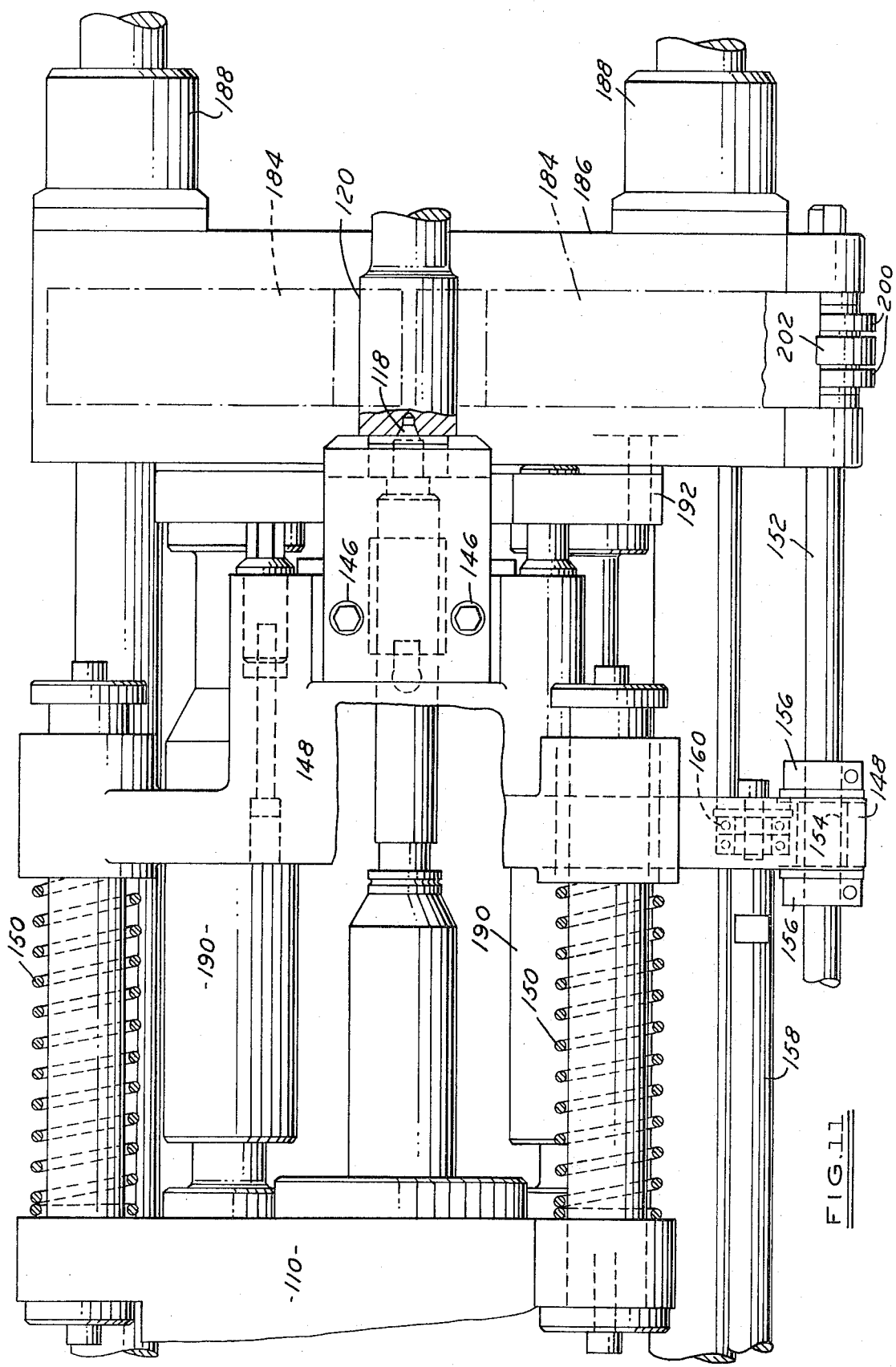

3,832,082

SERVO CONTROL FOR MANUFACTURING STATIONS

BACKGROUND OF THE INVENTION

The servo control system disclosed herein was developed to meet specific requirements for the automatic production machining of automotive shafts requiring a face milling operation on one end of a random mix of substantially different length axle shafts followed by a center drilling operation on the same end including automatic transport between operations. A fixed registration position for the opposite flanged end of all axle shafts established the need for automatically sensing any of a variety of discreet shaft lengths and corresponding movement of machining carriage and transverse milling head to a predetermined position independent of minor variations in shaft length among parts of a given size. Conservation of time together with substantially different shaft lengths indicated a need for rapid advance and retract as well as accurate final positioning.

In order to accommodate drilling at the next station, similar rapid advance and retract and part sensing requirements were present with the additional requirement for a controlled lead feed, preferably utilizing the available hydraulic carriage positioning power system.

SUMMARY OF THE INVENTION

The invention comprises a servo mechanism adapted to control hydraulic movement of a machining carriage to a precise position responsive to the sensing of a workpiece which may extend to any of a plurality of discreet possible positions at a machining station to modulate feed rate or otherwise control the manufacturing head in operating on the workpiece and finally to control the retraction of the carriage. The servo mechanism includes means to engage one end of a workpiece at the machining station and adjust the servo mechanism to change the feed of the manufacturing head from fast forward to modulated gradual forward movement until a precise position is reached or a precisely controlled manufacturing operation is completed whereupon the servo mechanism converts into a retract mode. In one preferred embodiment the servo mechanism is adapted to precisely position the machining head at one of a finite plurality of locations depending upon corresponding lengths of the part in turn correlated with the possible locating positions. In the other embodiment the servo mechanism is used to locate the end of the part and precisely control the linear feed of the manufacturing head in operating upon the workpiece.

DESCRIPTION OF THE DRAWINGS

FIG. 1 is a side view of the servo mechanism installed on a milling carriage;

FIG. 1a is a fragmentary side view showing a plurality of part extensions;

FIG. 2 is a schematic end view taken along the line 2—2 of FIG. 1 of the servo mechanism installed on the milling carriage;

FIG. 3 is a view taken normal to the plane of FIG. 2 showing a portion of the part sensing mechanism;

FIG. 4 is a top view of a portion of the mechanical linkage shown in FIG. 1;

FIG. 5 is a fragmentary cross section taken along the line 5—5 of FIG. 1;

FIG. 6 is a fragmentary cross section taken along the line 6—6 of FIG. 1;

FIG. 10 is an end view taken along the line 10—10 of FIG. 9;

FIG. 11 is a fragmentary top view of the drilling head;

FIG. 12 is a detailed fragmentary view taken in the direction 12 of FIG. 9; and

FIG. 13 is a partial detail section taken along the line 13—13 of FIG. 8; and

DESCRIPTION OF THE PREFERRED EMBODIMENT

Figure 7:
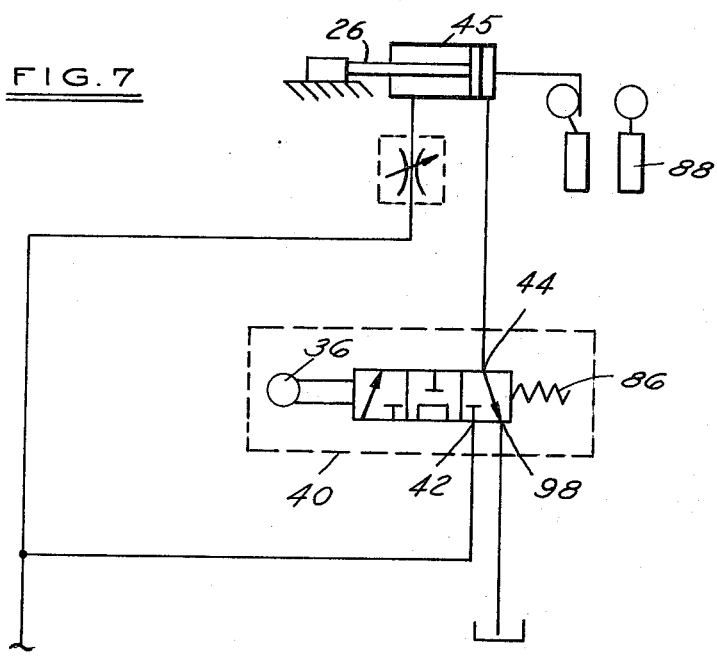
FIG. 7 is a schematic partial hydraulic circuit controlled by the servo mechanism at the milling station.

FIGS. 1, 1a and 2 schematically show a milling carriage 27 for face milling the stem end of axle shafts. Those features necessary for the understanding of the invention are shown in detail, while other portions conventional in the art are omitted for clarity. Axle shafts are brought to the milling station on a walking beam conveyor and clamped in a fixed position by means not shown. Upon arrival the stem end of an axle shaft will occupy one of a plurality of positions generally denoted by 20. The six positions shown in FIG. 1a indicate any of six axle shaft lengths to be machined at the milling station and to which the milling carriage automatically adjusts. In operation, the milling cutter 22 mounted on the milling head 24 moves axially on a carriage at the milling station. The milling head 24 is also mounted on a transverse slide 25 fixed on the carriage 27 mounted on the bed 29 to accommodate cross feed of the milling cutter 22 in milling across the end of the axle shaft 20 by conventional power feed means not shown. A hydraulic cylinder (45 in FIG. 7) is adapted to actuate the piston rod 26 to move the carriage 27 in a linear direction parallel to the axis of the milling cutter 22.

The arrival of a part 20 at the milling station will signal the solenoid 28 to depress the plunger 30 and rotate the bell crank 32 clockwise about the pivot 33. The solenoid 28 and bell crank 32 are mounted on a support plate 34 in turn attached to the axially movable portion of the milling carriage 27. The bell crank 32 is connected at 36 to the spool 38 of a control valve 40. Thus, the movement of the bell crank 32 will allow fluid at full pressure to pass from the inlet port 42 of the valve to the cylinder port 44 and in turn actuate the axial milling carriage positioner hydraulic cylinder 45 controlled by the valve 40 as shown in FIG. 7. The milling head 24 will move axially toward the part 20 in fast forward mode.

Upon reaching an axle 20 in any one of the plurality of positions shown in FIG. 1a the cylinder 45 actuation is converted to gradual actuation and accurately stopped by linkage as follows: The stem end of the axle 20 will be contacted by the lever 46, shown in FIGS. 2 and 3, mounted on a shaft 48, in turn mounted in bushings 50 and 52 fastened to the front of the milling head 24. Contact of the axle 20 by the lever 46 will turn the shaft 48 and thereby rotate a second lever 54 located at the other end of the shaft 48 actuating push rod 56 axially.

Referring to FIG. 1 and FIG. 4, the rod 56 is located in bushings 58 and 60 in turn fastened to the support plate 34. The rod 56 is biased to the left as shown in FIG. 1 by a spring 62 abutting a support 64 also mounted on the support plate 34. Thus the lever 46 is resiliently urged to a position by the spring 62 for sensing an axle 20. The rod 56 has a stop 68 fastened thereto by a set screw 66. The stop 68 extends through a slot 70 in the plate 34 and is guided thereby. The stop 68 engages a lever 72 in turn attached to a tube 74 concentric with and rotatable on the rod 56. At the other end of the tube 74 is fastened a lever 76 and counterweight 78. As is shown in FIGS. 4 through 6 the counterweight 78 rotationally biases the tube 74 to retain the lever 72 in engagement with the plunger 80 of a second solenoid 82. The lever 76 contacts the bell crank 32 at 84. Thus, movement of the rod 56 to the right relative to the support 34 moves the stop 68, tube 74 and levers 72 and 76 to the right thereby rotating the bell crank 32 about its pivot 33 counterclockwise and allowing the spring 86 inside the valve 40 to move the spool 38 leftwardly. As the bell crank 32 is moving counterclockwise and the spool 38 approaches the balanced condition shown, the limit switch 88 will be actuated before the balanced condition is reached and signal the solenoid 82 to depress the plunger 80 thereby rotating the lever 72 out of contact with the stop 68. Rotation of the tube 74 will in turn cause the lever 76 to rotate similarly thus placing a tongue 90 extending from the lever 76 in position to engage the next stop to the left of the tongue. The plurality of stops 92 are mounted stationary relative to the plate 34 and the axial movement of the milling head 24. Simultaneously, a spring 94, compressed between the bushing 60 and a bearing 96 at the end of the tube 74, biases the tube 74 and lever 76 to the left and thereby allows the bell crank 32 to rotate slightly clockwise under the bias of the plunger 30 and solenoid 28. Thus, the milling carriage will continue to move forward at a reduced rate until the tongue 90 engages the next stop 92. Each of the stops 92 corresponds to each of the possible axle lengths indicated at 20 in FIG. 1. The appropriate stop 92 is thus automatically selected by the above sequence initiated by the contact of the lever 46 with the end of the axle 20.

Engagement of the tongue 90 with the appropriate stop 92 combined with the continued forward motion of the milling head 24 and plate 34 will cause the bell crank 32 to again rotate counterclockwise thereby moving the spool 38 into the balanced condition shown with exhaust port 98 in communication with the other ports. The milling head 24 will therefore be axially located accurately at the proper position for face milling the end of the axle. After a time delay included in the limit switch 88 circuit assures that the milling carriage has completely stopped axial movement, the limit switch 88 actuates clamps (not shown) which grip the stem end of the axle 20. Closure of the clamps then signals actuation of conventional hydraulic power means not shown to reciprocally translate the milling head 24 on slide 25 face milling the end of the axle 20. Completion of such movement of the milling head 24 actuates the solenoid 28 to release the plunger 30 and in turn thereby allow the spring 86 in the valve 40 to rotate the bell crank 32 counterclockwise to the maximum extent thus moving the spool 38 to the left into maximum speed carriage retract position. The valve 40 with the spool 38 in the maximum left position allows a full flow of pressurized fluid through the exhaust port 98 from the cylinder port 44 and closes the inlet port 42. Upon completion of carriage retraction the limit switch 100 will be contacted by the stop 102 thereby actuating the milling head 24 to retract. Simultaneously the bell crank 32 will engage the stop rod 104 at 106 thereby assuring that the spool 38 in the valve 40 is returned to the balanced position shown.

Figure 8:
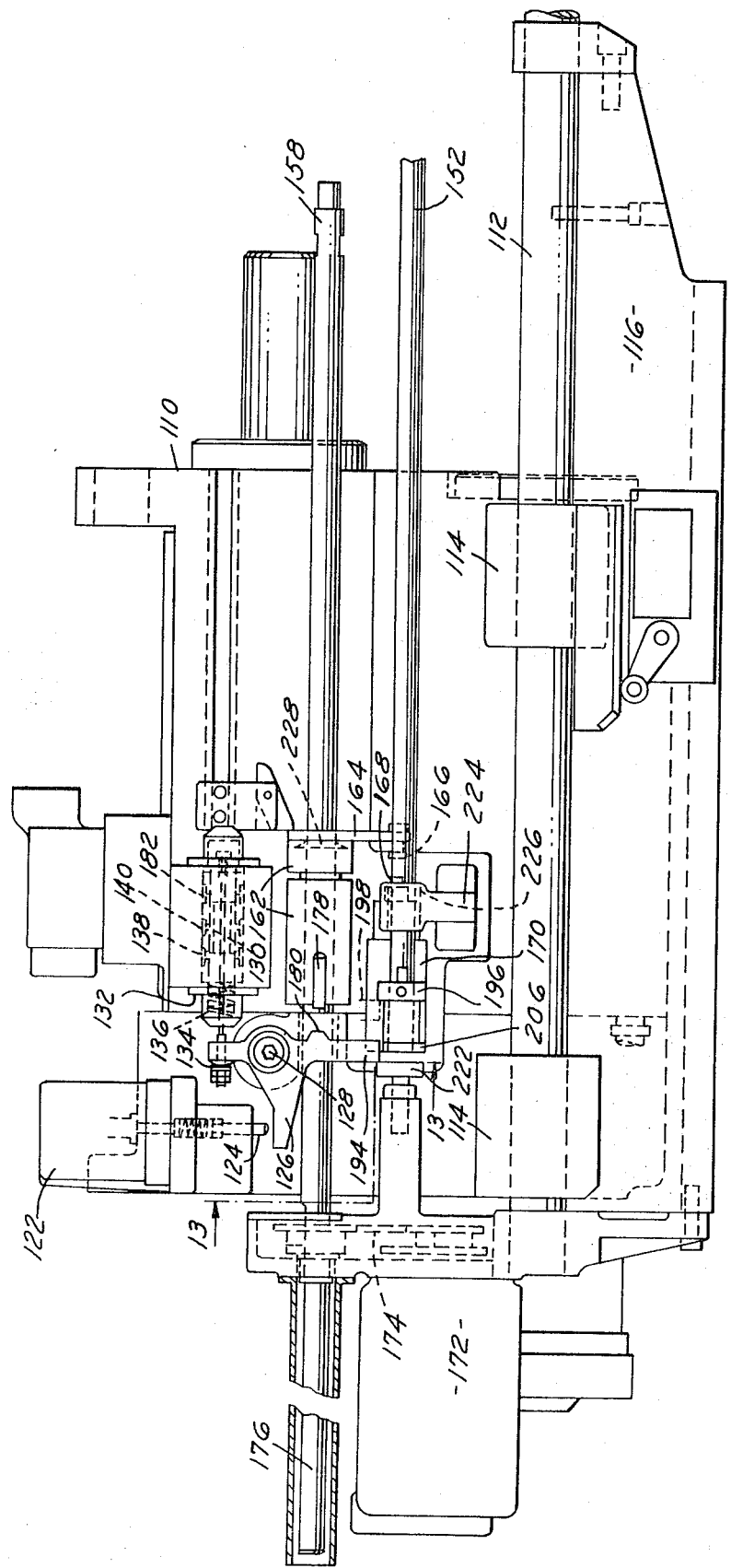
FIG. 8 is a fragmentary side view of the servo mechanism installed on a drilling carriage.
Figure 9:
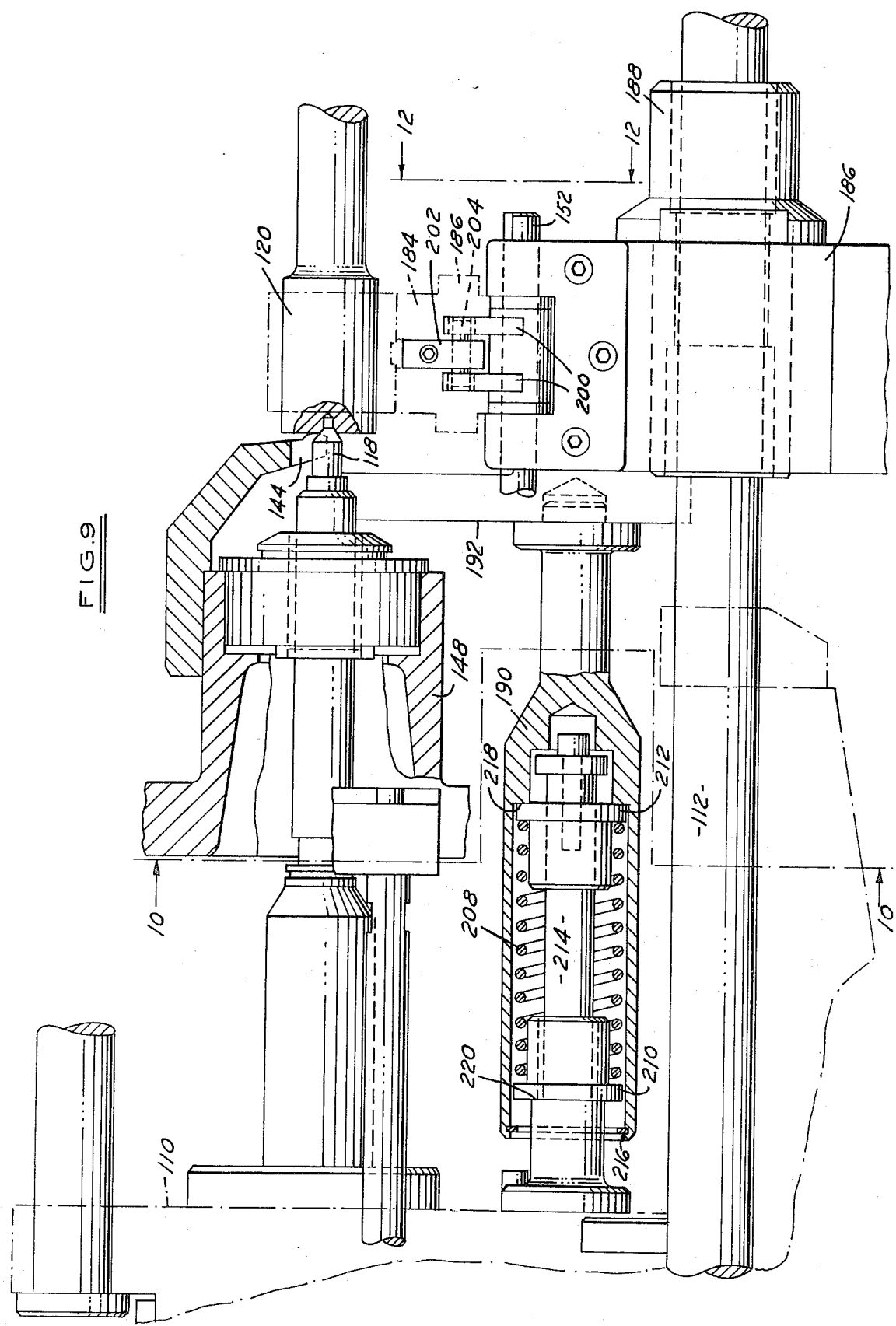
FIG. 9 is a fragmentary partially sectional side view of the drilling head.

In FIGS. 8 and 9 a second embodiment of the invention is shown in the form of an axially moveable drill unit carriage 110 mounted on parallel guide rods 112 with spaced ball bushings 114. The guide rods 112 in turn are mounted on a stationary base 116. In FIG. 8 the drill unit is in fully retracted position whereas in FIGS. 9 and 11 the drill unit is shown with the center drill 118 fully inserted in the stem end of an axle 120 at the completion of the center drilling operation. Only those features of the drill unit necessary for the understanding of the invention are shown in detail, other portions conventional in the art being omitted for clarity. Axle shafts are brought to the drill unit on a walking beam conveyor as in the case of the previously described milling unit. Upon arrival, the stem end of an axle can occupy any axial position within the axial range of the drill unit. The position shown is merely a typical position for an axle shaft at the drilling station and to which the drill unit automatically adjusts.

The various parts of the servo mechanism controlling the operation of the drill unit will be described with their function in the operation of the unit. The arrival of a part 120 at the drilling station will signal the solenoid 122 to depress the plunger 124 thereby rotating the bell crank 126 counterclockwise about the pivot 128. The solenoid 122 and pivot 128 are mounted on the drill unit 110 and move therewith. The bell crank 126 is connected at 134 to a spool 130 located in a control valve 132. Thus, the counterclockwise rotation of the bell crank 126 moves the spool 130 leftwardly compressing the spring 136 and opening the exhaust port 138 into full communication with the cylinder port 140. As is shown schematically in FIG. 14 the valve 132 controls the operation of a differential cylinder 142 which in turn powers the axial motion of the drill unit carriage 110. The drill unit thus moves in fast forward mode toward the stem end of an axle 120 until the gauge head 144 contacts the stem end of the axle 120 on either side of the center drill 118 as shown in FIGS. 9 and 11. The gauge head 144 is mounted on the gauge head assembly 148 which stop their forward motion upon contact with the axle 120. The drill unit 110 continues forward establishing a preset axial load on the axle shaft such as 15 pounds applied through the twin springs 150 compressed between the drill unit 110 and the gauge head assembly 148.

A gauge rod 152 passes through a bore hole 154 in the gauge head assembly 148. Collars 156 are fastened to the gauge rod 152 at each end of the bore hole 154 causing the gauge rod 152 to stop axial motion with the gauge head 144. A bearing 160 connects a lead screw shaft 158 at the forward end to the gauge head assembly 148 to allow rotation of the lead screw shaft while its axial motion is stopped with the gauge head 144.

Mounted on the lead screw shaft 158 is a lead screw nut assembly 162 having a bracket 164 attached. The bracket 164 has an adjustable stop 166 adapted to contact a limit switch probe 168 of a limit switch 170 which in turn is mounted on the drill unit carriage 110. The arrested axial movement of the lead screw shaft 158 also stops the forward motion of the lead screw nut 162, bracket 164 and stop 166.

The continued forward motion of the drill unit 110 in compressing the springs 150 brings the probe 168 into contact with the stop 166 actuating a synchronous stepping motor 172 mounted on the base 116 of the drill station. The stepping motor through a set of sprockets and chain 174 begins to rotate the lead screw shaft 158 by means of the splined end 176 which allows the lead screw shaft 158 to move with the drill unit 110 and gauge head assembly 148 prior to engaging the axle. The continued fast forward motion of the drill unit 110 also brings a stop 178 into engagement at 180 with the bell crank 126 just after the probe 168 is engaged by the stop 166. The engagement of the stop 178 with the bell crank 126 causes the bell crank to rotate clockwise against the bias of the solenoid plunger 124 and causes the spool 130 of the valve 132 to move to the right into a modulating position of the valve 132.

Figure 14:
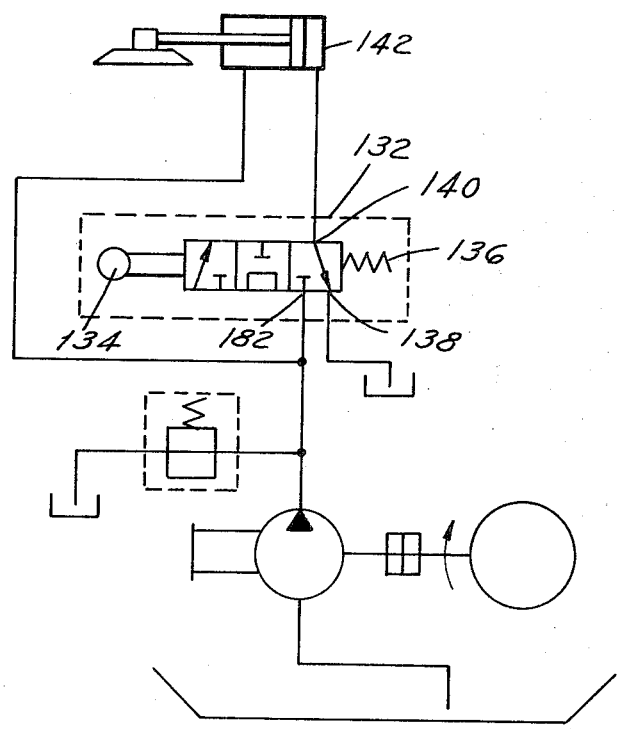
FIG. 14 is a schematic hydraulic circuit controlled by the servo mechanism on the drilling carriage.

As shown in FIG. 14 the hydraulic circuit provides full pressure to the small end of the differential piston 142 and modulated pressure to the large end with the spool 130 substantially in the central position. Since the lead screw shaft is axially fixed at this point of the drilling cycle, the axial motion of the lead screw nut 162 and stop 178 relative to the axial motion of the drill unit 110 will modulate the spool 130 of the valve 132 since the solenoid plunger 124 biases the bell crank 126 against the stop 178. The axial motion of the lead screw nut 162 is constant and provided by a four ball bearing on a slight helix angle formed by boring the bearing pin hole at the required angle for the lead screw nut 162 axial speed desired in proportion to the rotational speed of the lead screw shaft 158. Therefore, by modulating the valve spool 130 the drill unit 110 can be caused to follow the lead screw nut 162 axially in a controlled manner to provide a precisely controlled axial lead movement of the center drill 118. Thus any deviation of the drill unit 110 speed relative to the axial speed of the lead screw nut 162 the spool 130 will be accordingly moved to allow more fluid to enter through the inlet 182 or exhaust through the outlet 138.

Engagement of the probe 168 by the stop 166 also actuates the axle shaft stem clamps 184 shown in FIGS. 9 and 11 mounted on the clamp head 186 having bushings 188 slideable on the supporting guide rods 112. The clamp head 186 is connected to the drill unit 110 by a pair of tubes 190 attached to a plate 192 in turn fastened to the clamp head 186 and include spring assemblies the operation of which will be described below. Thus, the clamp head 186 and clamps 184 move forward with the drill unit carriage 110 prior to engagement of the axle shaft 120 by the gauge head 144 and modulation of the valve 132. The clamps 184 grip the axle shaft 120 as the lead screw nut 162 begins to move axially on the lead screw shaft 158. The valve 132 then shifts to modulation mode under control by the bell crank 126 as described above. The drill unit 110 will continue to move under modulated control until the tongue 194 of the bell crank 126 engages the adjustable stop 196 on the gauge rod 152 as shown ghosted at 198.

The forward motion of the drill unit 110 will cause the bell crank 126 to rotate clockwise closing the exhaust port 138 and bringing the drill unit 110 to a halt. The lead screw nut 162 will continue to move forward until the probe 168 disengages from the stop 166 causing the synchronous stepping motor 172 to stop and thereby halt the rotation of the lead screw shaft 158. The limit switch 170 also actuates the solenoid 122 to release the probe 124 permitting the spring 136 to shift the spool 130 to the right into partial retract position.

Actuation of the stem clamps 184 previously noted above rotates the gauge rod 152. As shown in FIG. 12, actuation of the clamp 184 moves the bracket 202 and pin 204 attached to the clamp 184, the pin 204 in turn rotating the crank 200. The movement of the crank 200 clockwise in FIG. 12 rotates the gauge rod 152 thereby rotating the gauge rod stop 206 shown in FIGS. 8 and 13. Thus, when the solenoid 122 releases the probe 124 thereby allowing the bell crank 126 and spring 136 to shift the spool 130 to the right into partial retract position the gauge rod stop 206 engages the bell crank tongue 194 preventing full clockwise motion of the bell crank 126 and further rightward movement of the spool 130. The pressure inlet 182 of the valve 132 will not be fully open and the initial retract mode will be limited to a relatively slow retract speed. The disengagement of the probe 168 from the stop 166 also signals the clamps 184 to open; however, a time delay is incorporated to allow the drill unit 110 to retract the center drill 118 from the axle 120 under the control of the spool 130 in the initial retract mode before the stem clamps 184 are released.

The tubes 190 as shown in FIG. 9 allow the necessary lost motion for center drilling and initial retract as follows: A compression spring 208 is positioned between twin collars 210 and 212 on the inner shaft 214. In relaxed condition the collar 210 abuts the snap ring 216 and the collar 212 abuts the shoulder 218. After the stem clamps 184 have engaged the axle 120 the controlled forward motion of the drill unit 110 causes the shoulder 220 on the inner shaft 214 to move the collar 210 to the right thus compressing the spring 208 to the position shown in FIG. 9.

The time delay noted above and actuated by the release of the probe 168 allows the clamps 184 to remain closed on the axle shaft 120. After the time delay, the center drill 118 is retracted from the axle 120 and the stem clamps 184 release the axle shaft. Release of the clamps 184 rotates the crank 200 counterclockwise in FIG. 12 thereby rotating the gauge rod stop 206 into the position shown in FIG. 13. The spring 136 is then free to move the spool 130 to the right fully opening the port 182 for rapid retract. Upon the drill unit 110 being fully retracted, the tongue 194 of the bell crank 126 will abut the stop 222 mounted on the base 116 thus assuring that the bell crank 126 returns to the position shown in FIG. 8 and the spool 130 is in balanced position to stop the drill unit 110. The end of the gauge rod 152 is supported by a bracket 224 having a bushing 226 engaging the gauge rod 152.

The use of a helical ball bearing in the lead screw nut 162 on a smooth rotating lead screw shaft 158 allows a sliding oil seal 228 to be inserted under the bracket 164 in a chamber in the lead screw nut 162. The oil seal 228 cleans the shaft 158 with each cycle and eliminates the problems that arise when a threaded shaft and split nut are used and debris from the drilling operation or other manufacturing operation accumulates in the threads.

By the use of a timer or fixed limit switch locations for preselected depths of drilling the servomechanism can be used for step drilling by releasing and reactuating the solenoid 122. The drill unit will cycle through a partial rapid retract and rapid return to the previous depth of cut by stopping the lead screw shaft until the reengagement of the limit switch probe 168 with the stop 166. The retraction and return distance during step drilling will be controlled by the tubular units 190 which are designed with a lost motion range great enough to accommodate the full drilling depth anticipated.

Referring again to the milling station described above in relation to FIGS. 1 – 7, as an alternative to facilitate higher production rates, a pre-gauging station may be incorporated ahead of the milling station which will include workpiece sensing mechanical means such as heretofore described for the milling station operative to determine the next workpiece size while the preceding part is being milled. If the next workpiece size is the same, no change in the positioning of the milling head will be necessary and the operation of retraction and repositioning after the next part arrival at the milling station can be eliminated with corresponding saving of cycle time. Even if the next work piece size is different, the repositioning can take place during its transfer to the milling station rather than after arrival, again with saving of cycle time.

The modification of mechanical linkage and controls necessary to incorporate such pre-gauging station will be obvious to those skilled in the art involving only an auxiliary by-pass circuit to avoid retraction and repositioning when the same workpiece size is involved, and interstation linkage between the pre-gauging station and the milling station for rendering the required milling head positioning gauge stop effective when a different part size is involved, the latter being operative after a normal retraction of the milling head as in the illustrated embodiment to limit the readvancement upon selective gauge stop engagement responsive to the pre-gauge station linkage.

I claim:

1. A machine tool servo control system comprising a tool carriage hydraulically moveable on a machine base, means for holding a workpiece relative to said carriage, hydraulic valve means for regulating carriage movement relative to said workpiece including rapid and modulated gradual modes of operation, workpiece sensing means responsive to said carriage reaching a predetermined position relative to said workpiece, and valve modulating means actuated by said workpiece sensing means adapted to convert carriage movement from rapid to gradual mode upon reaching said predetermined position relative to said workpiece and to continuously regulate the effective extent of valve passage opening to accurately control the rate of carriage movement during said gradual mode.

2. A control system as set forth in claim 1 including means adapting said sensing means to automatically actuate said valve modulating means upon said carriage reaching a predetermined position relative to a predetermined surface of any of a plurality of substantially different size workpieces.

3. A control system as set forth in claim 1 including lead screw means adapted to control carriage movement through said valve modulation during said gradual mode operation.

4. A control system as set forth in claim 3 wherein said lead screw means comprises a friction ball bearing engaging a smooth cylindrical shaft with the balls arranged on a helical lead angle relative to the axis of said shaft, and means for producing a desired rate of relative rotation between said bearing and shaft corresponding to a desired lead rate for said gradual mode.

5. A control system as set forth in claim 2 including means adapting said control system to move said carriage automatically to a stationary position accurately related to any of said different size workpieces employing said gradual mode for final positioning.

6. A control system as set forth in claim 5 and including a plurality of discreet gauge means in fixed relation to said machine base corresponding respectively to said different part sizes and gauge sensing means supplementing said workpiece sensing means to effect a final positioning of said carriage accurately related to the gauge means automatically selected by said workpiece sensing means.

7. A control system as set forth in claim 6 adapted to perform a machining operation transverse to the direction of carriage movement.

8. A control system as set forth in claim 2 including means for employing said rapid mode to move said tool carriage into close proximity to its machining position and to employ said gradual mode to continue to move said carriage during a machining operation.

9. A control system as set forth in claim 8 including workpiece clamping means on said carriage operative during said machining operation and retraction of said tool carriage to said close proximity position.

10. A control system as set forth in claim 9 including resilient means incorporated in the mounting for said clamping means accommodating lost motion during said machining operation and retraction.

11. A control system as set forth in claim 10 wherein said workpiece is restrained against displacement in the direction of carriage movement by exterior means and wherein clamping engagement with said workpiece prevents displacement of said clamping means in said direction during said machining operation and retraction.

12. The control system as set forth in claim 1 wherein said valve means includes carriage forward, retract and intermediate modulating positions, said valve means and modulating means being mounted on said carriage and including mechanical linkage adapted to move said valve from said forward to said modulating position in response to said workpiece sensing.

13. The control system as set forth in claim 12 including yieldable means for biasing said valve means in one of said forward and retract positions, additional selectively operable predominant yielding means for biasing said valve means in its other position, and said mechanical linkage being adapted to overcome the prevailing effective yielding means in moving said valve means to said intermediate position.

14. The control system as set forth in claim 13 including stop means mounted on said base for engagement by an element of said mechanical linkage to effect a limit of carriage movement in each direction through movement of said valve means to an intermediate neutral position.

15. A control system as set forth in claim 12 including hydraulic cylinder and piston means with rod extending therefrom mounted to effect hydraulic movement of said carriage in one direction under constant pressure applied to the rod side of said piston when pressure is exhausted from the head side thereof and in the other direction when pressure is added to the head side due to the effective differential area of the piston head, said valve means having a port connected to the head side of said cylinder and exhaust and pressure ports respectively blocked from said cylinder port at a neutral position of said valve and including connections thereto upon movement of said valve in either direction from said neutral position whereby all forward, reverse and modulated movements, as well as stoppage of said carriage, may be controlled by the positioning of said valve relative to said three ports.

16. A control system as set forth in claim 12 wherein said mechanical linkage includes an element mounted on a feed screw rotatable to establish said gradual movement of said carriage in response to said workpiece sensing means.

17. A machine tool servo control system comprising gauging means for differentiating any of a plurality of distinctive workpiece sizes of successive individual workpieces to be machined, a tool carriage hydraulically moveable on a machine base, means for holding each successive workpiece in fixed relation to said machine base, hydraulic valve means for regulating carriage movement on said machine base including rapid and modulated gradual modes of operation, valve modulating means responsive to said gauging means adapted to convert carriage movement from rapid to gradual mode upon reaching a predetermined position relative to each different size of each successive workpiece and to continuously regulate the effective extent of valve passage opening to accurately control the rate of carriage movement during said gradual mode.

18. A machine tool servo control system as set forth in claim 17 wherein gauging and machining operations are performed at the same station while each workpiece is held in fixed relation to said machine base.

\* \* \* \* \*